(12) United States Patent
Wang et al.

(10) Patent No.: US 8,417,826 B2
(45) Date of Patent: Apr. 9, 2013

(54) METHOD AND SYSTEM OF OVERLOAD CONTROL IN PACKETIZED COMMUNICATION NETWORKS

(75) Inventors: Liwa Wang, Morris Plains, NJ (US); Yang Yang, Parsippany, NJ (US); Pengfei Zhu, Morris Plains, NJ (US)

(73) Assignee: Alcatel Lucent, Paris (FR)

( * ) Notice: Subject to any disclaimer, the term of this patent is extended or adjusted under 35 U.S.C. 154(b) by 1647 days.

(21) Appl. No.: 11/580,253

(22) Filed: Oct. 12, 2006

(65) Prior Publication Data

US 2008/0104377 A1    May 1, 2008

(51) Int. Cl.
*G06F 15/173* (2006.01)
(52) U.S. Cl. .................................. 709/229; 709/224
(58) Field of Classification Search .................. 709/235, 709/229
See application file for complete search history.

(56) References Cited

U.S. PATENT DOCUMENTS

| | | | | |
|---|---|---|---|---|
| 4,974,256 A * | 11/1990 | Cyr et al. | ................. | 379/112.04 |
| 5,774,668 A * | 6/1998 | Choquier et al. | ............. | 709/223 |
| 6,067,545 A * | 5/2000 | Wolff | ............................. | 709/223 |
| 6,252,950 B1 * | 6/2001 | Duty et al. | .................... | 379/111 |
| 6,377,975 B1 * | 4/2002 | Florman | ....................... | 709/203 |
| 6,496,505 B2 * | 12/2002 | La Porta et al. | ............... | 370/392 |
| 6,661,776 B1 * | 12/2003 | Kaufman et al. | ............. | 370/234 |
| 6,910,024 B2 * | 6/2005 | Krishnamurthy et al. | .... | 705/400 |
| 6,922,564 B2 * | 7/2005 | Witana | ........................ | 455/452.2 |
| 6,928,482 B1 * | 8/2005 | Ben Nun et al. | ............. | 709/235 |
| 7,068,607 B2 * | 6/2006 | Partain et al. | ................. | 370/241 |
| 7,274,666 B2 * | 9/2007 | Balakrishnan et al. | ....... | 370/232 |
| 7,447,152 B2 * | 11/2008 | Kim et al. | ..................... | 370/231 |
| 7,564,872 B1 * | 7/2009 | Chawla et al. | ................ | 370/468 |
| 2002/0181394 A1 * | 12/2002 | Partain et al. | .................. | 370/229 |
| 2003/0140147 A1 * | 7/2003 | Gavish et al. | .................. | 709/227 |
| 2003/0154284 A1 * | 8/2003 | Bernardin et al. | ............ | 709/226 |
| 2004/0165529 A1 * | 8/2004 | Lee | ................ | 370/230 |
| 2005/0155032 A1 * | 7/2005 | Schantz | ........................ | 718/100 |
| 2006/0120339 A1 * | 6/2006 | Akiyama et al. | ............. | 370/338 |

FOREIGN PATENT DOCUMENTS

| | | | |
|---|---|---|---|
| EP | 1039699 A2 | * | 9/2000 |
| EP | 1137316 A2 | * | 9/2001 |
| EP | 1703668 A1 | * | 9/2006 |

OTHER PUBLICATIONS

Wei Song; Hai Jiang; Weihua Zhuang; Xuemin Shen; , "Resource management for QoS support in cellular/WLAN interworking," Network, IEEE, vol. 19, No. 5, pp. 12-18, Sep.-Oct. 2005.*

* cited by examiner

*Primary Examiner* — Jeffrey R Swearingen
(74) *Attorney, Agent, or Firm* — M. I. Finston

(57) ABSTRACT

In a method for processor overload control in a wireless or other network, a processor occupancy level ("PO") of a network processing unit is monitored and compared to a target PO. If the measured PO exceeds the target PO, one or more network load sources are controlled to reduce the data load of the processing unit, until the measured PO falls below a designated PO. "Load source" refers to a source of extant and/or potential data traffic through the processing unit, and/or a network control factor relating thereto, the control of which results in a reduction (or prevents an increase) in the data traffic handled by the processor. Examples include existing data flows, new calls, and BE flow window size. The load sources are controlled according to differentiated QOS levels, wherein non delay-critical data flows (e.g., BE flows) are reduced before delay-critical data flows, e.g., EF or AF flows.

22 Claims, 5 Drawing Sheets

METHOD AND SYSTEM OF OVERLOAD CONTROL IN PACKETIZED COMMUNICATION NETWORKS

FIELD OF THE INVENTION

The present invention relates to communications and, more particularly, to control systems for packet-data wireless communication networks.

BACKGROUND OF THE INVENTION

Wireless, radio frequency communication systems enable people to communicate with one another over long distances without having to access landline-connected devices such as conventional telephones. While early systems were primarily configured for voice communications, technological improvements have enabled the development of "3-G" (third generation) and similar wireless networks for both voice and high-speed packet data transfer. For example, CDMA-based, "1x-EVDO" (Evolution Data Optimized, or Evolution Data Only) wireless communication networks, now implemented in many parts of the U.S. and elsewhere, use the CDMA2000® 3-G mobile telecommunications protocol/specification for the high-speed wireless transmission of both voice and non-voice data. 1x-EVDO is an implementation of CDMA2000) that supports high data rates, specifically, forward link data rates up to 3.1 Mbit/s, and reverse link rates up to 1.8 Mbit/s in a radio channel dedicated to carrying high-speed packet data, e.g., a 1.25 MHz-bandwidth radio channel separate from the radio channel for carrying voice data.

In 3-G packet data networks, e.g., those using the Internet Protocol ("IP") for data transmission generally and voice over IP ("VoIP") for voice-data transmission, data is broken into a plurality of addressed data packets. For example, with VoIP, analog audio/voice signals are captured, digitized, and broken into data packets. The data packets, both voice and non-voice, are then transmitted and routed over an IP-based communications network, where they are received and reassembled by the access terminal to which the data packets are addressed. Unlike circuit switched systems, however, in which a physical or logical circuit (e.g., pathway) is established for each call (with the resources for the circuit being dedicated to the call during the entirety of its duration), the data packets may be sent at different times, out of order, and/or along different pathways. In this manner, data transmission resources are utilized in a more efficient and optimized manner.

The use of VoIP allows voice services to be integrated with multimedia and other packet data services in a wireless communication network. This facilitates a diversity of applications, and may increase overall system performance. However, wireless networks present a particular challenge to packet voice traffic. Generally speaking, as network load increases, there is an increased likelihood of dropped calls, poor quality calls (e.g., resulting from increased frame error rates), long transmission latencies, and the like, all of which may lead to high user dissatisfaction rates. More specifically, the air interface in a wireless network (e.g., the radio link between one or more fixed base stations and various mobile or other wireless access terminals) is dynamic by nature, as is the system capacity and the performance associated with each voice user. Thus, there may be occasions where not enough bandwidth is available to accommodate every active user according to target quality of service ("QOS") levels. Additionally, even if bandwidth is available, there may be times when it is not possible to meet target or required QOS levels in transmitting voice or other data packets to a wireless access terminal, due to varying radio airlink conditions or the like.

In some instances, these problems may be compounded as a result of limitations in network electronic processing capacity. In particular, carrying out wireless packet data communications involves the ongoing electronic processing of large numbers of data packets. For this purpose, each element of network infrastructure (e.g., wireless units, base stations, RNC, MSC, etc.) will typically include one or more microprocessors or other electronic processing units. When network traffic load is heavy, processor resources may be overextended, e.g., in a particular leg/hop of the communication channel there may not be enough processing power to accommodate the data load according to required or target QOS levels. Additionally, during times of traffic overload the processing units and communication buses connected thereto tend to have complex and/or erratic processor overload behaviors. These factors may result in flow drop and dropped packets, resulting in poor quality calls and unacceptable system performance.

SUMMARY OF THE INVENTION

An embodiment of the present invention relates to a method for processor overload control in a wireless communication network, for purposes of controllably reducing processor load during times of heavy network traffic and thereby reducing incidents of data loss and the like that might negatively affect system performance. On an ongoing basis, the processor occupancy level ("PO" or "PO level") of a network microprocessor or other electronic processing unit is monitored (e.g., periodically measured) and directly or indirectly compared to a target PO level. The processing unit is at a location in the network where data is processed, for example in a base station controller or an RNC. If the measured PO exceeds the target PO, one or more network load sources associated with the processing unit are controlled to reduce the data load of the processing unit, until the measured PO falls below a designated PO. (The designated PO level may be the same as the target PO, or it may be a different value.) By associated "load source," it is meant a source of extant and/or potential data traffic through the processing unit, and/or a network control factor relating thereto, the control of which prevents an increase in the data traffic handled by the processing unit, and/or that results in a reduction thereof. Such sources include data packets and data flows on the forward and/or reverse links, newly initiated calls/communications, forward link BE flow window size, and the like.

In another embodiment, network load sources are controlled to reduce processing unit data load according to differentiated quality of service ("QOS") levels. Thus, non delay-critical data flows/packets (e.g., BE flows) are reduced or eliminated before a controlled reduction in delay-critical data flows/packets, e.g., EF or AF flows. (A "flow" is a stream of data packets between a particular source address/port and a unique destination address/port, wherein the packets are generated according to the same protocol.) For example, if the measured PO exceeds a target PO level, and if a projected reduction in BE flows will reduce the processor load to below a designated PO level, then the BE flows are controllably reduced without affecting any EF flows. If on the other hand a reduction or elimination of BE flows will not sufficiently ease processor load, then EF flows may also be controllably reduced.

In another embodiment, network load sources are controlled to reduce the processing unit PO level by carrying out one or more of the following processes: reconfiguring BE forward link window size; muting a percentage of Rel 0 and Rev A reverse link BE flows; dropping a percentage of forward link EF packets; skipping a percentage of forward link time slots in scheduling; and temporarily halting the admission of newly initiated calls/communications over the network for the processing unit.

In another embodiment, network load sources are controlled both at the processing unit itself, and by issuing appropriate commands to other components in the network, depending on the particular load source to be controlled. For example, if it is determined to temporarily halt the admission of new calls/transmissions for the processing unit in question, a command to this effect may be issued to the RNC.

In another embodiment, the processing unit includes one or more processing sub-units. Data traffic may be monitored with respect to the processing unit as a whole, but more typically with respect to the processing sub-units individually. On a periodic ongoing basis, the PO levels of the processing sub-units are measured and compared to one or more target PO's. Based on the ongoing comparisons, network load sources are controlled with respect to the processing sub-units.

BRIEF DESCRIPTION OF THE DRAWINGS

The present invention will be better understood from reading the following description of non-limiting embodiments, with reference to the attached drawings, wherein below.

DETAILED DESCRIPTION

Figure 1:
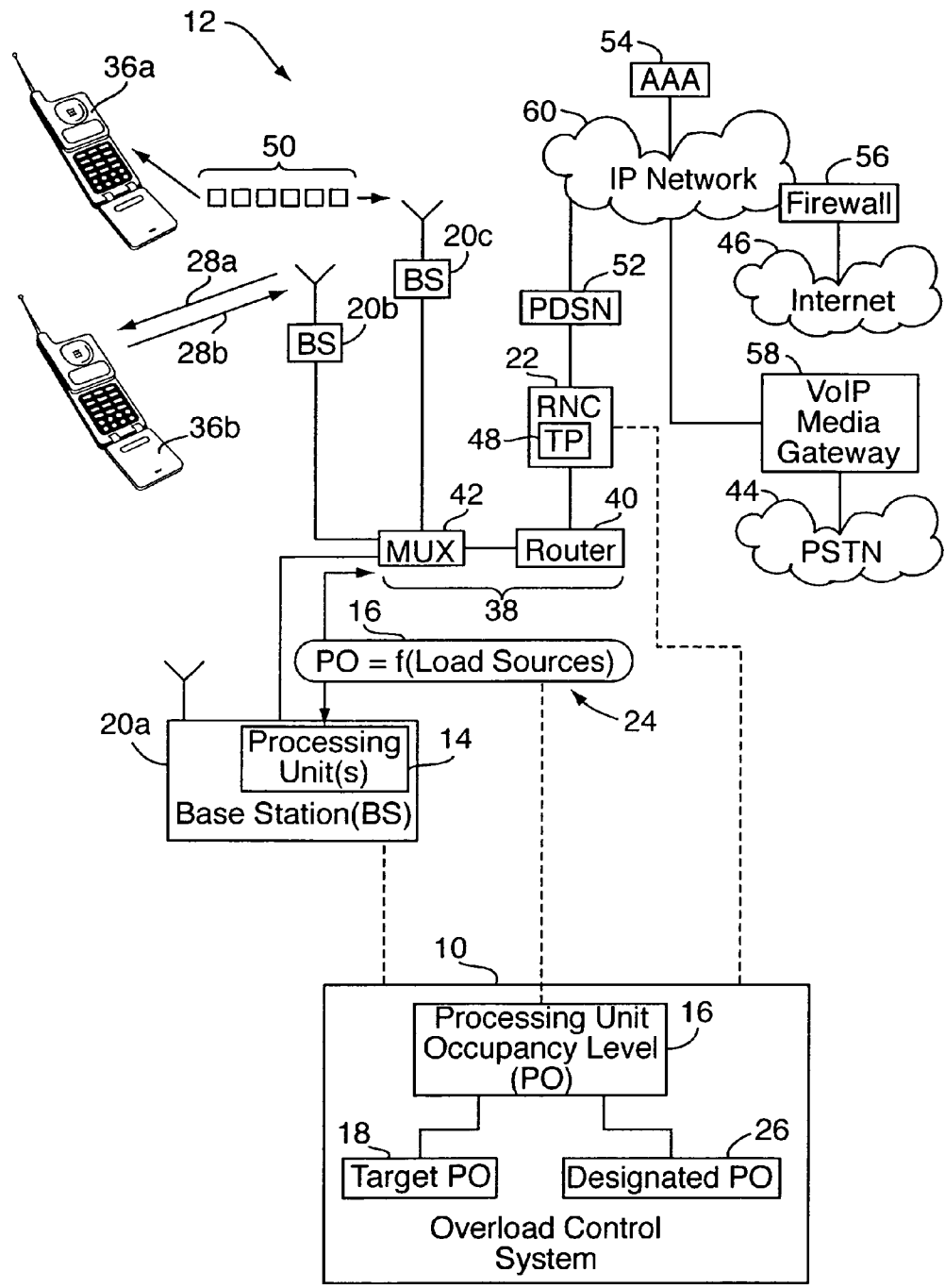
FIG. 1 is a schematic diagram of a wireless communication network with an overload control system according to an embodiment of the present invention.

With reference to FIGS. 1-7, an embodiment of the present invention relates to a method and system 10 for processor overload control in a wireless communication network 12. Typically, the system 10 is used to monitor and controllably reduce the amount of data being processed by a network microprocessor or other electronic processing unit 14 during times of heavy network traffic, e.g., if the processing unit becomes overloaded, thereby reducing incidents of data loss, data delay, and the like. On an ongoing basis, the processor occupancy level ("PO" or "PO level") 16 of the processing unit 14 is monitored (e.g., periodically measured) and compared to a target processor occupancy level 18. The processing unit 14 is part of a base station ("BS") 20a-20c, a radio network controller ("RNC") 22, or other network component where data is processed. If the measured PO 16 exceeds the target PO 18, one or more network load sources 24 associated with the processing unit are controlled to reduce the data load of the processing unit 14, until the monitored PO 16 is at or below a designated PO 26. (The designated PO 26 may be the same as the target PO 18, or it may be a different value, e.g., a designated percentage of the target PO 18.) By associated "load source" 24, it is meant a source of existing and/or potential data traffic through the processing unit 14, and/or a network control factor relating thereto, the control of which prevents an increase in the data traffic handled by the processing unit, and/or that results in a reduction thereof. Such sources include data packets and data flows on the network forward link 28a and reverse link 28b, newly initiated calls/communications, forward link BE flow window size, and the like. Typically, the degree to which the processor data load is reduced will be proportional to the extent to which the monitored PO 16 exceeds the target PO 18.

Figure 2:
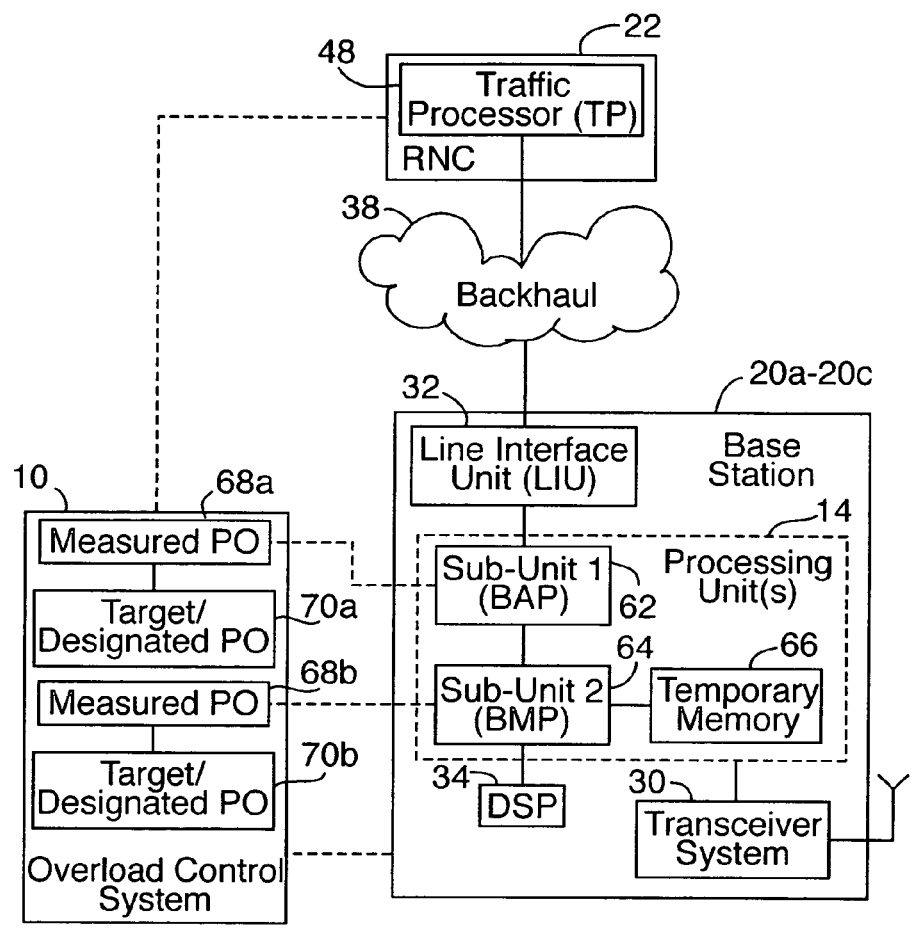
FIG. 2 is a detailed schematic view of a base station (BS) and radio network controller (RNC) portion of the wireless network, according to an additional embodiment of the present invention.

As noted, the processor overload control system 10 is implemented as part of a wireless telecommunication network 12. One example of such a network 12 is shown in FIGS. 1 and 2. In the network, an area of land is geographically divided into a number of cells or sectors (not shown), which are typically contiguous and which together define the coverage area of the network. Each cell is served by a base station ("BS") 20a-20c. Among other possible components, each base station may include one or more electronic processing units 14, a transceiver system 30 (e.g., fixed/stationary transceivers and antennae), a line interface unit ("LIU") 32, and one or more digital signal processors ("DSP") 34. These components are configured to operate in coordination for carrying out wireless communications with a set of distributed wireless units 36a, 36b (e.g., mobile phones) that provide service to the network's users. The LIU 32 acts as a communication interface between the base station 20a-20c and RNC 22, for the transfer of data there between. In conjunction with the DSP 34, the processing unit 14 processes data as required according to the communication protocols in place on the network. The transceiver system 30 includes a number of antennae for receiving and transmitting RF signals, and various electrical sub-components for modulating data signals at radio frequency levels for transmission and reception over the forward and reverse links, respectively.

Various methods exist for conducting wireless communications between base stations 20a-20c and wireless units 36a, 36b. One such method is the CDMA (code division multiple access) spread-spectrum multiplexing scheme, widely implemented in the U.S. under various standards as discussed above. In a CDMA-based network, transmissions from wireless units to base stations are across the reverse link 28b, which is a 1.25 MHz frequency bandwidth centered at a first designated frequency. Generally, each wireless unit is allocated the entire bandwidth all of the time, with the signals from individual wireless units being differentiated from one another using an encoding scheme. Transmissions from base stations to wireless units are across the forward link 28a, which is a similar 1.25 MHz frequency bandwidth centered at a second designated frequency. The forward and reverse links may each comprise a number of traffic channels and signaling or control channels, the former primarily for carrying data, and the latter primarily for carrying the control, synchronization, and other signals required for implementing CDMA communications. Thus, in the case of CDMA communications, the processing unit 14 may be configured to separate and decode spread-spectrum signals received over the airlink, and to combine and encode signals for transmission over the airlink, among other functions.

The base stations 20a-20c are in turn connected to the RNC 22 over a "backhaul" communication pathway 38. For example, the backhaul 38 might include a concentrator router 40 and a high capacity multiplexer ("MUX") 42, wherein data received at the RNC 22 is forwarded to the concentrator router 40 and then over a high capacity line to the MUX 42 for transfer to the base stations 20a-20c. The RNC 22 acts as the interface between the wireless/radio end of the network 12 and various internal and external networks such as a public switched telephone network ("PSTN") 44 and the Internet 46. The RNC 22 includes a traffic processor unit ("TP") 48 for performing the signaling functions necessary to establish calls or other data transfer to and from the wireless units 36a, 36b. For high-speed data transmission to and from the Internet 46 or elsewhere (e.g., for facilitating web browsing, real time file transfer, or downloading large data files), the network 12 may use the Internet Protocol, where data is broken into a plurality of addressed data packets 50. For use in transferring packet data 50 between the network 12 and other networks such as the Internet 46, the wireless network 12 may include a packet data serving node ("PDSN") 52 for routing wireless unit-originated or terminated packet data, an authentication, authorization, and accounting module ("AAA") 54, one or more firewalls 56, and a VoIP media gateway 58 that converts VoIP transmissions into a format suitable for transfer over the PSTN 44 (e.g., analog voice signals) and vice versa. The network 12 may also include a core IP network portion 60 for internal landline communications between different elements of the network, e.g., between the RNC 22 and AAA module 54 or other service center.

Although the base stations 20a-20c are illustrated as each having one processing unit 14, it may instead be the case that each includes a number of processing units, depending on the capacity of the base station. When a call or other communication is newly initiated, one of the processing units is temporarily assigned to process the call. When the call is terminated, the processing unit is freed up, and may be assigned to process another call. Additionally, referring back to FIG. 2, each processing unit 14 may include one or more processing sub-units 62, 64, as well as temporary memory 66 such as RAM. In this example, the first processing sub-unit 62 ("BAP") acts as a processing interface with the LIU 32, while the second processing sub-unit 64 ("BMP") functions as a processing interface with the DSP 34 and temporary memory 66. (Such configurations are found, for example, in the Lucent Technologies®/Qualcomm® single-board 1x-EV modem.) According to the present invention, processor occupancy level may be monitored with respect to the processing unit 14 as a whole, and/or with respect to each processing sub-unit 62, 64. For illustrative purposes, the overload control system 10 and associated method will be further described in terms of monitoring processor overload for a plurality of processor sub-units such as shown in FIG. 2. However, the method may be applied to processing units having different configurations. Additionally, unless other specified herein, the term "processing unit" generally refers to any electronic module having signaling and data processing functionality, whether it be a processing sub-component of a larger processing unit or a unit that itself has one or more processing sub-components.

With reference to the processing unit 14 in FIG. 2, according to one embodiment of the present invention, processing unit overload is monitored and controlled for each sub-unit 62, 64. In other words, the PO level of each sub-unit is monitored on an ongoing basis, with one or more control actions possibly being carried out if the PO level of either sub-unit exceeds a target PO. Additionally, PO level is controlled on a per-link basis, for both the forward link ("FL") 28a and the reverse link ("RL") 28b. Thus, the overload control system 10 includes the following functional elements:

BAP FL overload control
BMP FL overload control
BAP RL overload control
BMP RL overload control If the network 12 utilizes differentiated quality of service ("QOS") levels, then network load sources 24 are controlled to reduce processing unit data load according to the differentiated network QOS levels. Thus, non delay-critical data flows/packets (e.g., BE flows) are reduced before a controlled reduction in delay-critical data flows/packets, e.g., EF or AF flows. (A "flow" is a stream of data packets between a particular source address/port and a unique destination address/port, wherein the packets are generated according to the same protocol.) EF, AF, and BE flows are implemented according to a set of scheduling and queuing schemes, in a standard manner, such as those defined by the IETF "DiffServ" standard. Designated EF flows provide a low loss, low latency, low jitter, assured bandwidth, and end-to-end service through the network 12, e.g., akin to a point-to-point connection or "virtual leased line." Designated AF flows have a minimum rate guarantee and low loss rate. BE flows are transmitted at the best efforts of the network, typically without system monitoring or guaranteed rates. Thus, in each processor 14 and/or processor sub-unit 62, 64 there may exist multiple data flows that include BE flows, AF flows, and EF flows. For bearer traffic packets (e.g., packets carrying user data as opposed to network signaling data), the flows can be simplified as comprising (i) BE flows for any applications that do not have a stringent delay and (ii) EF flows for applications that have stringent delay constraints wherein the data packets have to be processed and delivered at a minimum delay. Examples of the latter include VoIP and VT flows. Thus, as noted above, since BE flows do not have stringent delay constraints, the overload control system 10 is configured to control the BE flows first. EF flows are impacted only if controlling the BE flows is insufficient to reduce processor load to a desired level.

Figure 3:
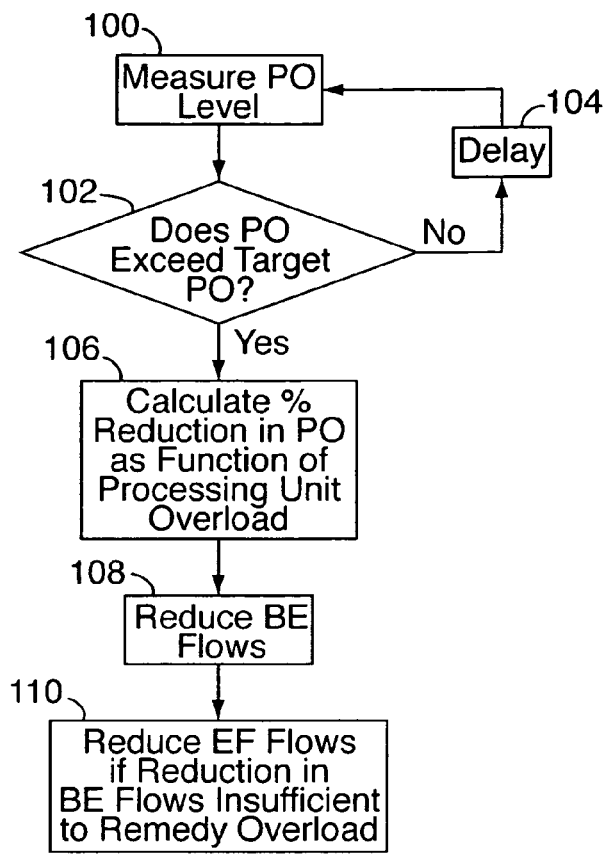
FIGS. 3-7 are flowcharts showing various operational aspects of the overload control system.
Figure 5:
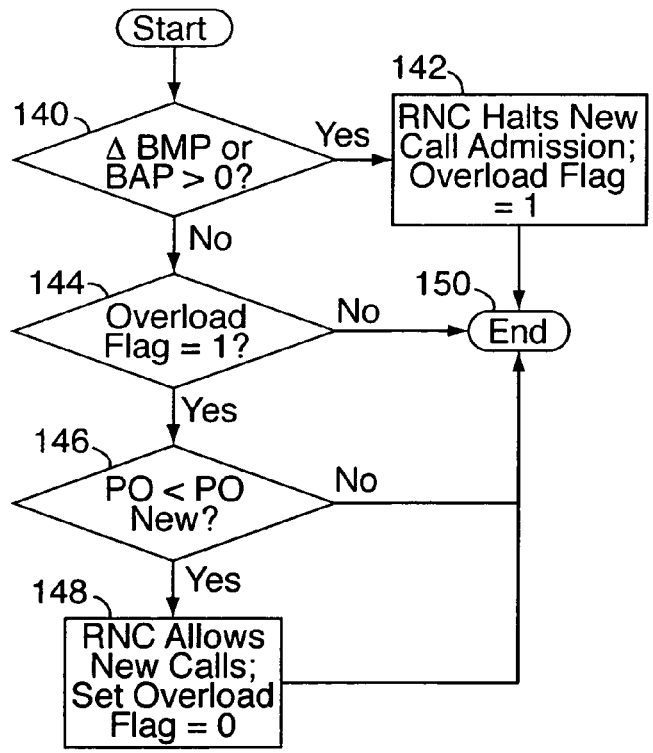
Figure 4:
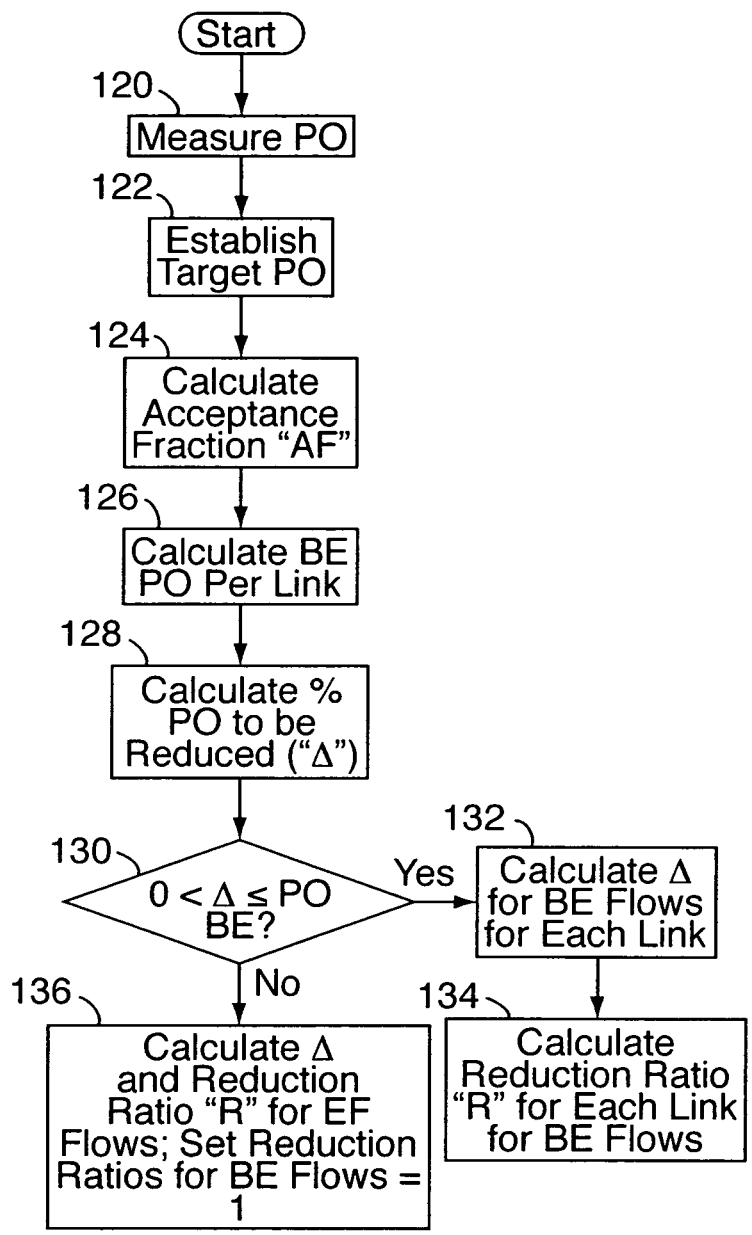

With reference to FIGS. 2 and 3, operation of the overload control system 10 is summarized in simplified form. (The system 10 may be implemented as a hardware module, hardware/software module, script or other software program, or suite of software programs integrated with the processing units and/or with one or more network components (e.g., the base stations and RNC) for carrying out the method described herein.) For each processing unit 62, 64 being monitored for overload control, at Step 100 the PO level 68a, 68b of the processing unit 62, 64 (respectively) is measured using standard methods, e.g., by initiating a reporting function or sub-routine of the processing unit, or by way of a direct calculation based on the number of data packets processed by the processing unit. At Step 102, it is determined if the measured PO 68a, 68b exceeds a target PO level 70a, 70b. If not, the processing unit PO is again measured at a later time, after a designated delay 104. If so, at Step 106 the system 10 calculates a percentage reduction in PO level as a function of processing unit overload, e.g., the system calculates the extent or degree to which the PO level is to be reduced as a function of the extent to which the measured PO exceeds the target PO. At Step 108, BE flows through the processing unit are controllably reduced/restricted based on the calculated percentage reduction. This may be done in one or more of several manners, as discussed in more detail below, including temporarily halting new call admission, reconfiguring the BE FL window size, muting a designated percentage of RL Rev A and Rel 0 flows, and skipping slots of packets in the DSP 34. If reducing (or even eliminating) the BE flows is inadequate to reduce the PO level 68a, 68b below the target PO 70a, 70b or some other designated PO level, then at Step 110 the system 10 controllably reduces EF flows to the extent required to bring the processing sub-unit out of its overload condition, e.g., by dropping a designated percentage of EF packets.

An embodiment of the present invention will now be explained in more detail with reference to FIGS. 1, 2, and 4-7. The following parameters are used in the overload control process:

AF: Acceptance fraction
PO: Processor occupancy (measured/actual)
$PO_{BE}\_FL$, $PO_{BE}\_RL$: PO for BE flows per link
$PO_{EF}$: PO for EF flows At Step 120, the PO level 16 of the processing unit 14, 62, 64 in question is measured. (The steps of FIG. 4 may be carried out for each processing unit or processing sub-unit of interest.) As noted above, this may be done by initiating a reporting function, subroutine, or utility program of the processing unit, or by way of a direct calculation based on the number of data packets processed by the processing unit. At Step 122, a target PO 18 ("$PO_{Target}$") is chosen. This is a translation parameter with a range, for example, of 70%-90%, with a default value of 85%. At Step 124, the acceptance fraction "AF" is calculated according to the following:

$$f_{PO} = PO_{Target} / PO$$
$$f = AF_{t-1} \cdot f_{PO}$$
$$AF_t = \max[\min(f, 1), f_{min}]$$

Here, $AF_{t=0}=1$, and $f_{min}$ is a constant value, e.g., 0.02, representing a minimum value for AF. $AF_t$ is updated every T seconds, wherein T is a tunable parameter in the range of, e.g., 1 to 10 seconds with a default value of 1 second. Thus:

$$\text{At } t = 1:$$
$$f = PO_{Target} / PO$$
$$AF_1 = \max[\min(PO_{Target} / PO, 1), 0.02]$$
$$\text{IF } PO \leq PO_{Target}, \text{THEN } AF = 1$$
$$\text{ELSE } PO > PO_{Target}, \text{THEN } 0.02 \leq AF < 1$$

As should be appreciated, if the measured PO level 16 does not exceed the target PO 18, then the acceptance factor AF will remain at 1. If the measured PO level 16 exceeds the target PO 18, then the acceptance factor AF will be a value between $f_{min}$ and 1. The acceptance factor AF thus acts as a measure of the extent to which the measured PO 16 exceeds the target PO 18, for use in controllably reducing BE flows, possibly EF flows, and other load sources 24.

At Step 126, the BE flow PO level per link is calculated, that is, the percentages of processor occupancy due to BE flows on the forward and reverse links are calculated, as follows:

$$PO_{BE}\_FL = NP_{BE}\_FL \cdot PO_{BEPK}\_FL$$
$$PO_{BE}\_RL = NP_{BE}\_RL \cdot PO_{BEPK}\_RL$$

Here, $NP_{BE}\_FL$ and $NP_{BE}\_RL$ are the average number of FL and RL BE packets passing through the processor in the last T seconds, respectively, where T is the same tunable parameter as used for calculating the acceptance factor AF. $PO_{BEPK}\_FL$ is the pre-calibrated average PO for one BE FL packet, and $PO_{BEPK}\_RL$ is the pre-calibrated average PO for one BE RL packet, both of which may be obtained through laboratory testing of the processing unit in question. Average values are only one type of statistical method usable in this process; virtually any statistic and adaptive filtering method can be applied to achieve desired accuracy for minimizing the difference between the actual and estimated values.

At Step 128, a value "Δ" is calculated, which represents the percentage PO to be reduced. Δ is calculated as:

$$\Delta = (1 - AF) \cdot PO$$

As should be appreciated, if AF=1 (meaning that the measured PO does not exceed the target PO), then Δ=0, meaning that the PO is not to be reduced. As AF approaches its minimum value of $f_{min}$ (e.g., 0.02), Δ increases to a maximum value of $(1-f_{min})$ PO, e.g., 0.98 PO (that is, 98% of the PO is to be reduced).

At Step 130, it is determined if Δ is less than or equal to $PO_{BE}$, where $PO_{BE}$ is the processor occupancy level due to BE flows and $PO_{BE} = PO_{BE}\_FL + PO_{BE}\_RL$. (In other words, the processor occupancy due to BE flows is equal to the total processor occupancy due to BE flows on the forward and reverse links.) If so, then at Step 132 a Δ value (e.g., percentage reduction) is calculated for BE flows for each link, as follows:

$$\text{IF } 0 < \Delta \leq PO_{BE}$$
$$\text{THEN}$$
$$\Delta_{BE}\_FL = \alpha \cdot \Delta \cdot (PO_{BE}\_FL / PO_{BE})$$
$$\Delta_{BE}\_RL = \Delta - \Delta_{BE}\_FL$$

Here, "α" is a tunable parameter in the range of, e.g., 1 to 1.5 with a default value of 1. Subsequently, at Step 134 a reduction ratio "R" is calculated for BE flows on each link, as follows:

$$R_{BE}\_FL = \Delta_{BE}\_FL / PO_{BE}\_FL$$
$$R_{BE}\_RL = \Delta_{BE}\_RL / PO_{BE}\_RL$$

Additionally, since EF flows are not impacted when a reduction in BE flows will be sufficient to remedy the overload condition (e.g., if $0 < \Delta \leq PO_{BE}$), the following values are assigned in relation to EF flows:

$$\Delta_{EF} = 0$$
$$R_{EF} = 0$$

Application of the reduction ratios is discussed below, and may depend on processing unit type.

Referring back to Step 130, if $\Delta > PO_{BE}$ (e.g., if the percentage of PO to be reduced is greater than the percentage of processor occupancy due to BE flows), then at Step 136 a "Δ" value and reduction ratio are determined for EF flows, as follows:

$$\text{ELSE } \Delta > PO_{BE}$$
$$\Delta_{BE}\_FL = PO_{BE}\_FL$$
$$\Delta_{BE}\_RL = PO_{BE}\_RL$$
$$R_{BE}\_FL = 1$$
$$R_{BE}\_RL = 1$$
$$\Delta_{EF} = \Delta - \Delta_{BE}\_FL - \Delta_{BE}\_RL$$
$$R_{EF} = \Delta_{EF} / (PO - PO_{BE}\_FL - PO_{BE}\_RL)$$

Subsequent to either Step 134 or Step 136, as the case may be, there will be a set of reduction ratios "R" for EF flows and BE flows ($R_{BE\_FL}$, $R_{BE\_RL}$, and $R_{EF}$), calculated according to the formulas above, for each processing unit/sub-unit of interest. These parameters, in addition to the other parameters discussed above, are used to controllably reduce processor occupancy level. First, in the overload control system 10, new call admission is controlled based on the Δ value, which, as noted above, represents the percentage PO to be reduced. If the acceptance fraction AF is less than 1 (representing a measured PO 16 that exceeds the target PO 18), then Δ>0. Accordingly, with reference to FIG. 5, at Step 140 it is determined if Δ>0 for the BMP sub-unit 62 and/or the BMP sub-unit 64 or other processing unit. If so, at Step 142 the RNC 22 is instructed to temporarily halt the admission of newly initiated calls/communications for processing by the processing unit 14. At the same time, an overload flag is set to "1" (indicating an overload condition). If not, then at Step 144 is it determined if the overload flag is set to "1." If so, at Step 146 it is determined if the measured PO is less than a value $PO_{NEW}$, where $PO_{NEW}$ is a designated tunable parameter 26 in the range of (1-10%) $PO_{Target}$ to $PO_{Target}$, with a default value of $PO_{Target}$. If so (e.g., if it is determined that the measured PO level 18 has fallen below a designated PO 26), then at Step 148 the RNC 22 is instructed to admit new calls/communications, and the overload flag is set to "0." The process ends at Step 150, until continued as at Step 120 in FIG. 4 at the next time interval T.

Figure 6:
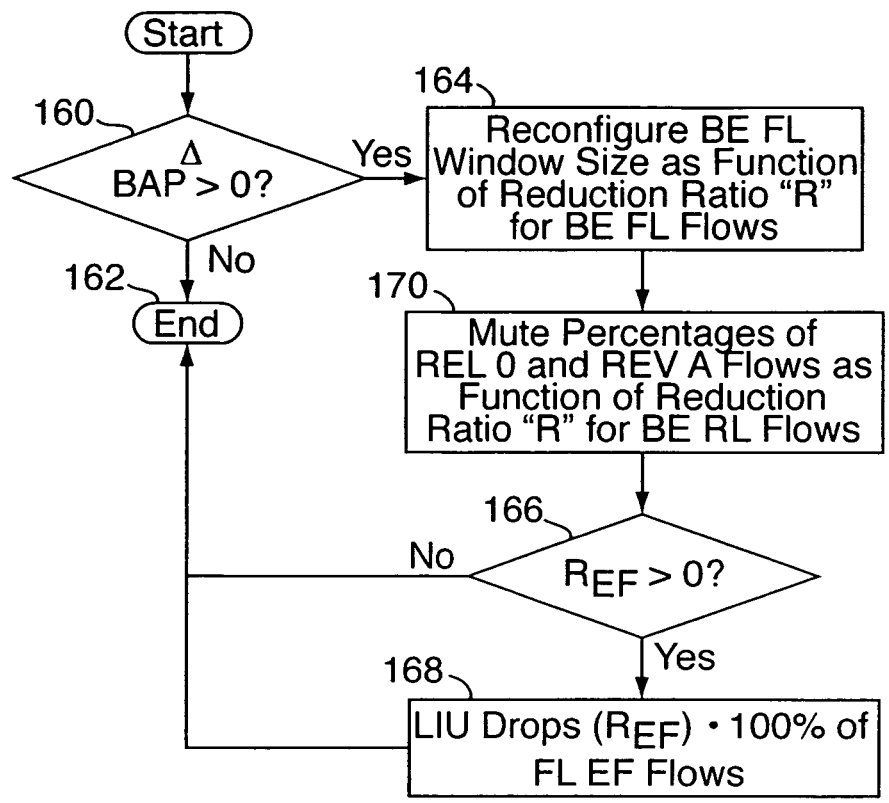

FIG. 6 shows the overload control process specific to the BAP sub-unit 62, based on AF, Δ, and R values, etc. calculated for the BAP sub-unit 62. At Step 160, it is determined if the Δ value for the BAP sub-unit 62 is greater than 0, which corresponds to an AF level for the BAP sub-unit 62 of less than one, which in turn corresponds to a processor overload condition where the measured PO 16 is greater than the target PO 18. If not, the process ends at Step 162, until continued as at Step 120 in FIG. 4 at the next time interval T. If so, for forward link overload control a new window size for BE flows is calculated at Step 164, as follows:

$$\text{new window size} = (1 - R_{BE\_FL}) \cdot (\text{configured window size})$$

As should be appreciated, the larger the value for $R_{BE\_FL}$, the smaller the window size. For example, if $R_{BE\_FL}=1$, then the new window size will be zero, which comports with eliminating the BE flows entirely until the overload condition is remedied. (Window size is the number of octets that can be sent over the flow under the flow control process.) At Step 166 it is determined if the reduction ratio "R" for EF flows is greater than 0. If so, at Step 168 the LIU 32 is instructed to randomly drop $R_{EF}$·100% of forward link EF packets:

IF $R_{EF} > 0$
THEN LIU drops ($R_{EF}$ · 100%) of forward link EF packets

Here, the LIU 32 is configured to drop EF flow packets according to the above when it receives a request to do so from the BAP sub-unit or otherwise from the overload control system 10.

For BAP reverse link overload control, still assuming a BAP Δ>0 at Step 160, at Step 170 designated percentages of Rel 0 and Rev A BE flows are muted, meaning that no packets are sent over these flows:

Mute $R_{BE\_RL}$ · Ratio_1 · 100% of Rel 0 flows
Where Ratio_1 = [(Rel0_flows) / (Rel0_flows + RevA_BE_flows)]
Mute $R_{BE\_RL}$ · Ratio_2 · 100% of Rev A BE flows
Where Ratio_2 = [(RevA_BE_flows) / (Rel0_flows + RevA_BE_flows)]

"Ratio_1" and "Ratio_2" correspond to the relative percentages of the Rel 0 and Rev A flows with respect to the combined Rel 0 and Rev A flows.

Figure 7:
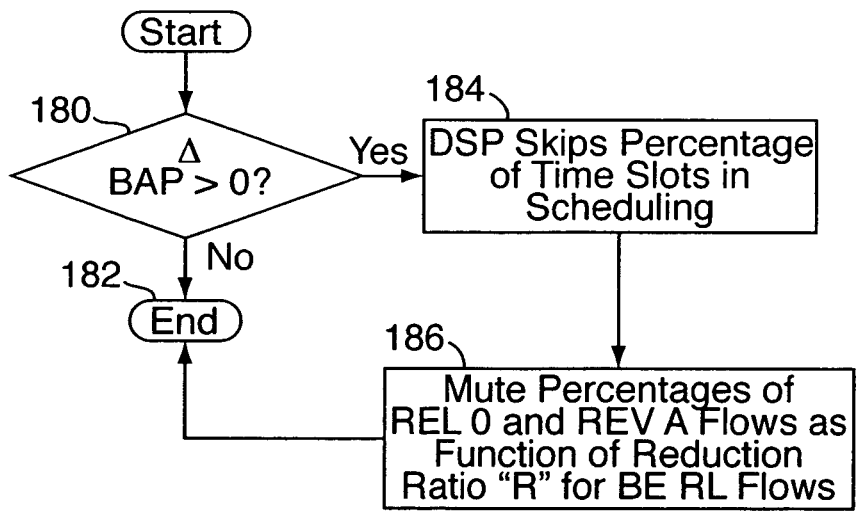

FIG. 7 shows the overload control process specific to the BMP sub-unit 64, based on AF, Δ, and R values, etc. calculated for the BMP sub-unit 64. At Step 180, it is determined if the Δ value for the BMP sub-unit 64 is greater than 0, which corresponds to an AF level for the BMP sub-unit 64 of less than one, which in turn corresponds to a processor overload condition where the measured PO 16 is greater than the target PO 18 for the BMP sub-unit. If not, the process ends at Step 182, until continued as at Step 120 in FIG. 4 at the next time interval T. If so, for forward link overload control, at Step 184 the DSP 34 is instructed to skip a designated percentage of time slots in scheduling at DSP:

$$\text{DSP skips} (R_{BE\_FL} + R_{EF}) 100\% \text{ slots of packets}$$

When a time slot is skipped, the DSP will not schedule packets to be sent at the slots. Instead, the packets will be stored in a buffer.

For BMP reverse link overload control, and still assuming BMP Δ>0, at Step 186 designated percentages of Rel 0 and Rev A BE flows are muted:

Mute $R_{BE\_RL}$ · Ratio_1 · 100% of Rel 0 flows
Where Ratio_1 = [(Rel0_flows) / (Rel0_flows + RevA_BE_flows)]
Mute $R_{BE\_RL}$ · Ratio_2 · 100% of Rev A BE flows
Where Ratio_2 = [(RevA_BE_flows) / (Rel0_flows + RevA_BE_flows)]

The BAP sub-unit 62 may receive window-shrinking requests from the LIU 32, from itself, from the overload control system 10, or the like. Whenever requests are received from any two or more sources in the same time period, the BAP sub-unit 62 uses the smallest overload control window size among the several requests. Additionally, the BAP sub-unit 62 may receive requests to mute RL Rel 0 and Rev A BE flows from the BMP sub-unit 62 and from itself. Whenever requests are received from any two or more sources in the same time period, the sum of the Rel 0 and Rev A BE flows to be muted should meet the maximum percentage needs among the BAP sub-unit, BMP sub-unit, and LIU. Additionally, the BAP sub-unit 62 may be configured to set and reset the overload flag for both the BAP and BMP, and may transmit the overload flag value to the RNC 22.

The base stations 20a-20c are configured to mute RL Rel 0 flows as requested by the BAP sub-unit or otherwise by the overload control system 10. Additionally, the RNC 22 is configured to mute the RL Rev A flows as requested by the overload control system. The RNC 22 is also configured to allow or disallow newly initiated calls as requested by the overload control system.

As noted above, the system 10 may be implemented as a hardware module, hardware/software module, script or other software program, or suite of software programs. The system 10 may be centralized, and possibly including one or more distributed sub-routines or utility programs operating in different parts of the network 12 for reporting and control purposes. Alternatively, the system 10 may be distributed about the network, e.g., in place in multiple iterations at each processing unit or sub-unit. In either case, the system is integrated with the processing units and/or with one or more network components (e.g., the base stations and RNC) for carrying out the methods described herein.

Since certain changes may be made in the above-described method and system of overload control in a packetized communication network, without departing from the spirit and scope of the invention herein involved, it is intended that all of the subject matter of the above description or shown in the accompanying drawings shall be interpreted merely as examples illustrating the inventive concept herein and shall not be construed as limiting the invention.

What is claimed is:

1. A method of data traffic control in a communication network, the method comprising:
   comparing a measured processor occupancy (PO) level of a network processing unit to a target PO level; and
   based on the comparison, controlling via at least one controlling operation at least one data traffic load source associated with the processing unit until the measured PO level falls to a level at or below a designated PO level, wherein:
   the at least one data traffic load source is a source of extant or potential data traffic through the processing unit or a network control factor relating thereto;
   at least one further load source is associated with the processing unit, each load source having a respective quality of service (QOS) level;
   the controlling operation is able to give different treatments to data flows having different QOS levels;
   the controlling operation is performed so as to reduce, by means other than dropping of calls, a selected processor load due to at least one admitted packet flow; and
   the selected processor load is selected based on its QOS level.

2. The method of claim 1 wherein:
   the at least one data traffic load source is controlled only to an extent sufficient for the measured PO level to fall below the designated PO level, the designated PO level comprising a designated percentage of the target PO level.

3. The method of claim 2, wherein:
   a total processor load includes partial processor loads having different respective QOS levels;
   the method further comprises determining one or more QOS-specific PO levels due to respective partial processor loads; and
   the extent of control of the at least one data traffic load source depends on at least one said QOS-specific PO level.

4. The method of claim 1 wherein:
   the data traffic load sources provide at least one first data flow at said delay-tolerant quality of service (QOS) level and at least one second data flow at a second, higher QOS level.

5. The method of claim 4 wherein the at least one first data flow includes one or more best efforts (BE) data flows, and the at least one second data flow includes one or more expedited forwarding (EF) data flows.

6. The method of claim 5, wherein the controlling operation comprises reducing a window size for the BE data flows.

7. The method of claim 6, wherein the reducing of the window size is performed recursively.

8. The method of claim 6, wherein the window size is reduced as a function of a forward link BE data flow PO level.

9. The method of claim 5 further comprising:
   controlling the BE flows for reducing the measured PO level of the processing unit; and
   only when control of the BE flows is insufficient for the measured PO level to fall below the designated PO level, dropping a percentage of forward link EF data packets to further reduce the measured PO level.

10. The method of claim 9, wherein the dropped percentage is a function of BE data flow PO level for forward and reverse links.

11. The method of claim 5 wherein:
    the at least one first data flow includes a plurality of Rel 0 data flows and a plurality of Rev A data flows; and
    the Rel 0 data flows and the Rev A data flows are controlled to reduce the measured PO level by muting respective designated percentages of the Rel 0 and Rev A data flows.

12. The method of claim 5, further comprising:
    controlling the BE flows for reducing the measured PO level of the processing unit; and
    only when control of the BE flows is insufficient for the measured PO level to fall below the designated PO level, skipping a percentage of forward link EF data packets to further reduce the measured PO level.

13. The method of claim 1 wherein:
    the at least one data traffic load source comprises a plurality of newly initiated network communications, the communications to be processed at least in part by the network processing unit; and
    the method further comprises halting admission of the newly initiated network communications until the measured PO level falls below the designated PO level.

14. The method of claim 1 wherein:
    the processing unit includes at least two processing sub-units; and
    the method further comprises, for each processing sub-unit:
    comparing a measured PO level of the processing sub-unit to a sub-unit target PO level; and
    when the measured sub-unit PO level exceeds the sub-unit target PO level, controlling the at least one data traffic load source to reduce the measured PO level of the sub-unit below a designated sub-unit PO level.

15. The method of claim 14 wherein:
    the at least one load source comprises a plurality of forward and reverse link data flows for each processing sub-unit; and
    the forward and reverse link data flows are controlled for each processing sub-unit.

16. The method of claim 1, wherein the controlling operation comprises, during at least some overload conditions, delaying without dropping packets associated with a first, delay-tolerant QOS level, and dropping packets associated with a second, delay-intolerant QOS level.

17. The method of claim 1, wherein:
    at least some packet flows are classified into classes according to joint criteria of QOS level and directionality of transmission, wherein the directionality may be forward link or reverse link;
    the controlling operation comprises reducing packet flow in at least a given one of said classes by a factor that depends on a load-to-occupancy ratio; and in said ratio, the load is a measure of excess load and the occupancy is an estimate of that portion of the current processor occupancy which is attributable to the given class of packet flow.

18. The method of claim 1, wherein the selected processor load has a delay-tolerant QOS level.

19. A method of data traffic control in a communication network, the method comprising:
determining that a measured processor occupancy (PO) level of a processing unit in the network exceeds a target PO level; and in response to such determination:
controlling via respective controlling operations at least two data traffic load sources associated with the processing unit to reduce the measured PO level to a level at or below a designated PO level, wherein:
each data traffic load source has a respective Quality of Service (QOS) level and is a source of extant or potential data traffic through the processing unit or a network control factor relating thereto;
different controlling operations are applied to data traffic flows having different QOS levels;
each controlling operation comprises reducing a data traffic flow by an amount that depends on the contribution of that particular data flow to a total PO level; and
at least one of said controlling operations is performed so as to reduce, by means other than dropping of calls, a selected processor load due to at least one admitted packet flow.

20. The method of claim 19 wherein:
the traffic load sources provide at least one first data flow at said delay-tolerant quality of service (QOS) level; and
the method further comprises reducing or eliminating the at least one first data flow to reduce the measured PO level.

21. The method of claim 20 wherein:
the data traffic load sources further provide at least one second data flow at a second, higher QOS level; and
the method further comprises reducing the at least one second data flow when eliminating the at least one first data flow is insufficient for the measured PO level to be reduced to the designated PO level.

22. The method of claim 19 wherein:
the traffic load sources provide a plurality of newly initiated network communications, the communications to be processed at least in part by the processing unit; and
the method further comprises halting admission of the newly initiated communications until the measured PO level is reduced to at or below the designated PO level.

* * * * *